United States Patent [19]
Bullo

[11] 3,875,912
[45] Apr. 8, 1975

[54] AUTOMATIC ELECTRONIC REGULATOR OF SPARK ADVANCE IN OTTO ENGINES

[76] Inventor: Aurelio Bullo, Viale dei Colli Portvensi, 544, Rome, Italy

[22] Filed: Aug. 16, 1971

[21] Appl. No.: 171,912

[52] U.S. Cl.... 123/117 R; 123/146.5 A; 123/148 E
[51] Int. Cl............................................... F02p 5/04
[58] Field of Search........ 128/117 R, 117 A, 148 E, 128/146.5 R

[56] References Cited
UNITED STATES PATENTS

| | | | |
|---|---|---|---|
| 2,220,558 | 11/1940 | Van Dijck | 123/198 |
| 2,407,652 | 9/1946 | Costa | 123/119 |
| 3,100,479 | 8/1963 | Wood | 123/148 E |
| 3,277,875 | 10/1966 | Miki | 123/117 |
| 3,454,871 | 7/1969 | Nolting | 324/16 |
| 3,521,611 | 7/1970 | Finch | 123/117 R |

Primary Examiner—Charles J. Myhre
Assistant Examiner—Ronald B. Cox
Attorney, Agent, or Firm—Watson, Cole, Grindle & Watson

[57] ABSTRACT

An automatic electronic regulator of spark advance in Otto Engines which compares the phase between explosion and crankshaft angle during each cycle, in order to provide an electric negative feed-back signal should an error result through such comparison with respect to a predetermined crankshaft angle as initially regulated. This electric negative feed-back signal will correct the spark advance for the next cycle.

In this manner, a very careful regulation of the ignition moment can be obtained, since the same conditions may be assumed between one cycle and the next.

4 Claims, 12 Drawing Figures

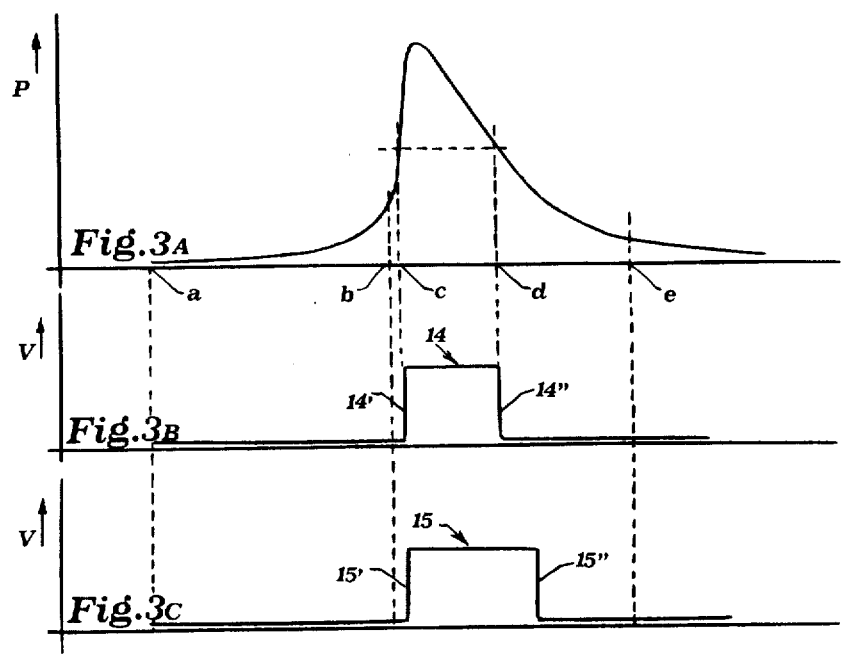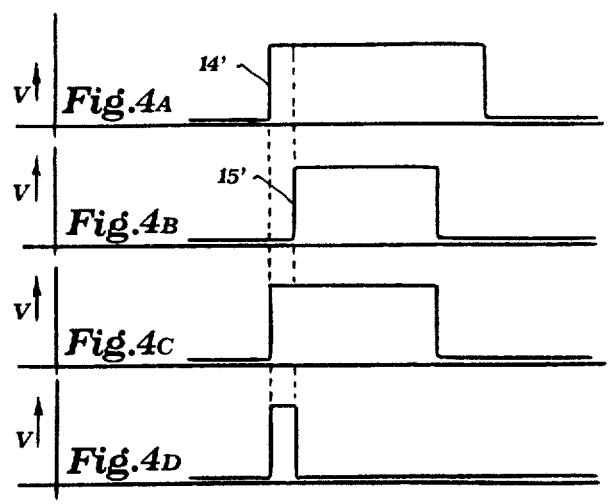

AUTOMATIC ELECTRONIC REGULATOR OF SPARK ADVANCE IN OTTO ENGINES

BACKGROUND

As is well-known, in Otto cycle internal combustion engines there is a difference of time between the spark and the gas expansion moments. In order to obtain the maximum efficiency, it is necessary that the peak pressure coincides with a set crankshaft angle or piston position, therefore it is necessary that an accurate spark advance with respect to the above angle be provided.

Since to the time-lapse between the spark and the gas be considered to be nearly constant, explicitly between the spark and the peak pressure point, with respect to the crankshaft speed, or rotation time, which is variable over a wide range, a device must be provided to regulate the spark advance angle as the engine RPM varies, in order to have the gas explosion just at the most favorable crankshaft angle. This angle is then substantially constant irrespective of the revolving speed and load conditions, since any other minor differences may be disregarded.

In actual fact, the time-lapse between spark and peak pressure, which was assumed to be constant with respect to a greater range of values of the engine's RPM, is also variable in dependence upon the fuel mixture compression degree at the ignition moment, temperature, fuel type, etc., and it will be understood that such time may repeatedly vary in a few seconds during the running, such in the case of engines which are operating on motor vehicles.

It can be said therefore that spark advance regulation has always been deemed as necessary. For providing said spark advance regulation, a mechanical type speed sensor has been almost universally used for many decennia, by which the spark advance angle is automatically varied according to the engine revolving speed.

An improvement was carried out, however, in the meantime, wherein a further correction of the spark advance angle was performed in dependence upon the fuel mixture compression, namely through a sensor, which is also of a mechanical type, suitable for sensing the vacuum which is pprovided within the carburetor air duct when the accelerator control is operated.

It will be apparent to those skilled in the art that through these methods and apparatus only a rough spark advance regulation may be automatically performed, so that in any revolving speed and load condition an engine may only occasionally reach its maximum efficiency, particularly in the case of a commercial type production thereof. Another drawback of prior art methods relates to the impossibility of such methods providing a further regulation when one or more of the previously mentioned causes may adversely effect the optimal operation of the engine, i.e., temperature, fuel type, carburation, etc., since the lapse of time being necessary for the expansion of burnt mixture may vary considerably thereby. Furthermore, it should be noted that the wear of some components such as contact points and spark plug electrodes, may change the relationship between the engine revolving speed and the ignition advance as established through an initial regulation of ignition advance.

Additionally the use of electronic components in the construction of internal combustion engines cannot be considered by itself as a novelty. Attempts have actually been made, for example, to provide electronic circuits for the ignition of fuel/air mixture, as well as for controlling ignition advance. Said attempts and embodiments, however, only concern the use of electronic systems for carrying out that which is up to the present has generally been carried out by mechanical means, and particularly, for example, the automatic regulation of the ignition advance as a function of revolving speed. such circuits, therefore, do not actually eliminate the drawbacks of mechanical system. In other examples, circuits are provided with various sensors relating to speed, compression, temperature etc., such information being sent to a calculator which determines the moment of ignition. Also this latter system, which in itself is very complex and costly, has the disadvantage of being limited in its function since it may take into account one, but not all of the causes which contribute to the modification of the time propagation of the explosion (for example, type of fuel). Furthermore, it requires the use of sensors having a considerable fidelity and constant features also in the long run and with variations in the environmental conditions.

SUMMARY OF THE INVENTION

The main object of the present invention is to provide for the automatic regulation of ignition advance in Otto internal combustion engines in a rapid and accurate manner when the engine is operating, which is not affected by variations of load and speed conditions, as well as any other cause generally modifying lapse of time between spark and peak pressure, so that the explosion always occurs at the optimaal crankshaft angle.

Another object of the present invention is to provide an electronic circuit for such automatic regulation, which is a comparator circuit, i.e., a circuit which during each cycle compares the phases of explosion and crankshaft angle one with the other. More exactly, comparison is made between an explosion signal, as provided by a suitable explosion sensor, and the position signal which is a pulse provided by another suitable sensor when the crankshaft finds itself at a predetermined position during each revolving cycle. An error signal may occur through that comparison, which will be suitably elaborated and amplified for automatically correcting the ignition advance for the next explosion, since an actuator of the ignition advance is controlled in response of the error signal.

A further object of the present invention is to provide the phase comparison at the initial front of square signals so as to obtain a very exact regulation as desired. The precision of the regulation is due to the fact that the explosion signal as provided by the explosion sensor (which should substantially be a more or less linear electrical transducer of the pressure within the combustion chamber) will be shaped with an initial or first very definite upward raising front, while the end downward front is not very definite beause of contingent engine conditions (for example, due to cylinder or valve wear).

Another object of the present invention is to provide said the comparison by using a bistable multivibrator circuit, that is a circuit which during each cycle changes its state at the initial front of either of the two signals being the very first to arrive, coming back to its original state at the end front of either of the two signals being the very first to end. Because of the change of its state, a pulse is provided which is used as a gate for obtaining an error signal from such a comparator if, and only if, a phase difference is deduced between the initial fronts from the phase comparator and not between end fronts thereof. This is within the scope which has been specified above.

A further object of the present invention is to provide an integrator circuit for integrating the pulse components of an error signal. Such an integrator circuit substantially comprises two current regulators, a capacitor and an impedance adapting device, which are connected in such a manner that capacitor voltage charge may readily vary when error signal pulses are provided, while a constant value is maintained in the absence of these pulses. The intent is to keep the ignition advance actuator in a stationary condition when there is no phase error between the two signals.

Another object of the present invention is to provide a current regulator as depending on a control voltage. This current regulator is connected to a monostable multivibrator circuit (in the manner detailed hereafter) in order to discharge by its current such a capacitor of monostable multivibrator circuit which determines the time constant of the same. The intent is to obtain that the time of pulse, which is provided by the monostable multivibrator, may vary within a very large range of values, that is, from a very short duration to a very long duration (even up to 100 times). Such a monostable multivibrator is used as an actuator for the ignition advance.

These and other objects of the present invention as well as the practical advantages of its application to Otto engines may best be understood by those skilled in the art by reference to the following description taken in conjunction with the accompanying drawings. The description and drawings relate to an example of an embodiment of the invention and not a limitation of the same, and only for simplification was the embodiment selected for a two-stroke-cycle monocylinder engine.

Improvement features and advantages of this electronic system for the automatic regulation of Otto engine ignition advance, as well as the possibility of application thereof to any other Otto engines (four-stroke-cycle and multi-cylinder engines as well as revolving piston engine) may be easily deduced by those skilled in the art. Changes and modifications may then be resorted to within the scope of the invention.

DESCRIPTION OF FIGURES

FIGS. 3A, 3B, 3C are comparison diagrams which refer to an assumed curve of pressures within the chamber of cylinder being selected as an example, the explosion signal pulse and crankshaft position pulse respectively.

FIGS. 4A, 4B, 4C, 4D are comparison diagrams which refer to explosion signal pulse (4A), crankshaft position signal pulse (4B), pulse (4C) provided by the phase comparator through the bistable multivibrator being acted by the signal pulses and error signal pulse (4D) which is provided by the phase comparison between the initial fronts of the signals 4A and 4B.

DESCRIPTION OF THE PREFERRED EMBODIMENTS

Figure 1:
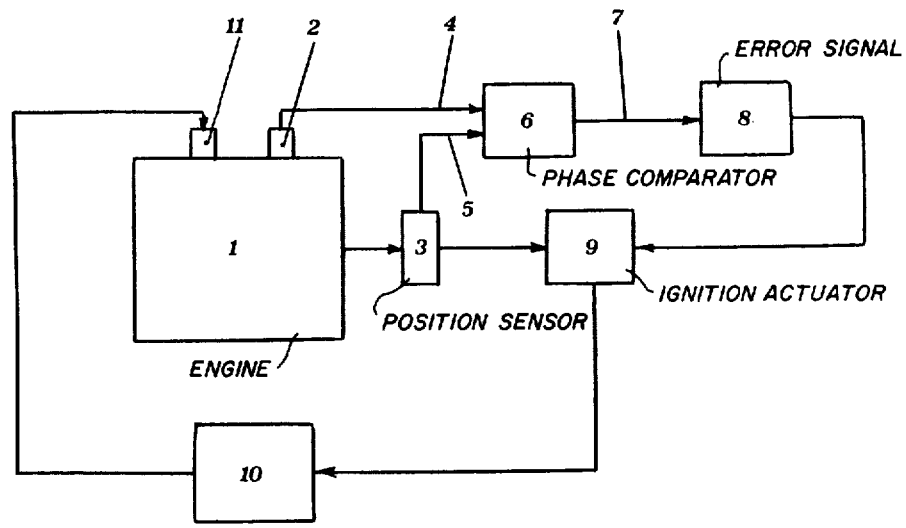
FIG. 1 is a block diagram of an automatic spark advance electronic regulator in accordance with the present invention, wherein the spark advance regulation is performed by means of the phase comparison between the explosion and crankshaft angle, and negative feedback of an error signal to an ignition advance actuator.

Referring now to the drawings, FIG. 1 shows in a block diagram a general automatic electronic regulator of ignition advance in accordance with the principles informing the present invention. In FIG. 1, the engine is indicated at 1 which is provided with explosion sensor 2 substantially comprising a transducer adapted for supplying an electric pulse when each explosion occurs within a cylinder combustion chamber. Such an explosion sensor may be of several structures : pz. electrical, electromagnetic, variable resistance, and it can be mounted directly on the head for sensing the variation of pressure within the combustion chamber, or applied outsidie thereof, so that the impact due to the explosion may be sensed through the metal surface of the chamber.

Another sensor is indicated at 3, which is the sensor of crankshaft position. It may comprise either a photoelectric cell, or an electromechanic contact breaker or anyy other suitable means fixed on the engine body, which may provide an electric pulse whenever the crankshaft passes through a predeterminated position during its revolving cycle. Explosion should occur when the crankshaft is at the predeterminated position for having the optimal engine efficiency, so that the possibility of changing the position of this sensor within a suitable area of the engine body will be desirable, for selecting a fastening point of the sensor which may be considered as the most suitable for the best setting of engine.

The two sensors 2 and 3 provide signal pulses 4 and 5 respectively, which enter phase comparator 6 for the desired comparison. A possible error signal 7, which comes out from the comparator 6 when the explosion signal does not coincide with the position signal, that is, when it does not correspond with the optimal crankshaft position, goes into a processor 8 for processing the error signal. Processor 8 is an electronic circuit comprising an integrator and, eventually, a power amplifier being capable of adapting the error signal both in its electrical and power form in order to control, via a negative feed-back circuit, the ignition advance actuator 9, and capable of providing the spark between the electrodes of spark plug 11 which is mounted on the engine body.

Ignition advance actuator 9 is substantially a device suitable for acting the high voltage generator. It may be designed as an electro-mechanical or as an electronic type device so long as it may vary the actuating instant of high voltage generator in relation to variation of a control voltage.

In this manner, whenever any one of the above cited causes is present, so that explosion could occur at a crankshaft angle which is different from the optimal angle, through the phase comparison a first error signal may be provided. The ignition advance actuator is thereby operated in a suitable direction, so that the next explosion occurs with an error which is smaller in relationship to the optimal crankshaft position, but being, nevertheless, capable of providing another error signal and consequently another ignition advance correction.

Very rapid and, consecutive ignition advance corrections, which are due to the signal succession of corresponding errors which become smaller and smaller, leads to the annulment, or at least to reduction of the error signal, to practically negligible values in the fraction of a second.

Automatic regulation of Otto engine ignititon advance is substantially performed in an electronic way according to the present invention and particularly through the counter-reaction of the error which results from phase comparison between explosion signal and crankshaft angle signal, i.e., through a closed loop counter-reaction system.

Referring now to FIGS. 2 to 7 there are general and detailed illustrations relating to a preferred embodiment of the present invention.

Figure 2:
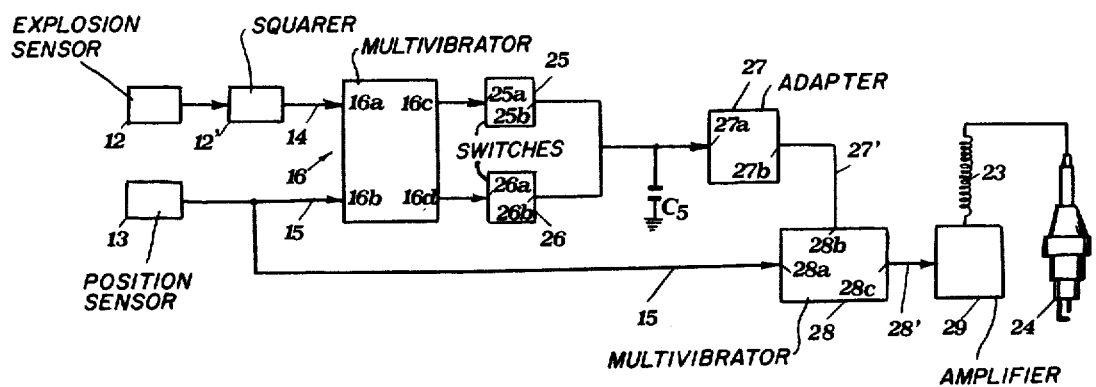
FIG. 2 is a block diagram of the selected electronic circuit for an example of the invention.

FIG. 2 is a general block diagram of the electronic circuit according to this embodiment, wherein the sensors of the explosion and the crankshaft position are indicated at 12 and 13, respectively.

The phase comparator is generally indicated at 16 in FIG. 2, wherein input $16_a$ and $16_b$ are connected to explosion signal 14 and position signal 15, respectively.

Explosion signal 14 comes out from explosion sensor 12 through a suitable squarer 12' which is used as an analog-to-digital converter, that is, adapted to convert analog type pulses coming out from the explosion sensor (i.e., proportional to pressure amplitude within the explosion chamber) to a logic type digital pulse (ON-OFF, between two voltage levels being accepted by components of phase comparator 16).

Position signal 15 is directly connected to crankshaft position sensor at input $16_b$ of phase comparator 16, as the position sensor may be carried out, for example, by means of a cam-operated contact breaker, or a photo-electric cell, so that a logic type signal may easily be directly obtained. However, when it is desirable to use a position sensor of a different type, that is when a sensor is used which does not provide a logic type signal, a pulse squarer also will be necessary for this sensor.

Outputs $16_c$ and $16_d$ of phase comparator 16 provide the error signal for the integrator formed by blocks 25 and 26, which indicate current regulators with ON-OFF switches as well as capacitor $C_5$ concurrently with block 27.

The error signal, which may then be considered as a negative feed-back signal of the circuit, is power amplified in block 27 for controlling the duration of pulse 28' of monostable multivibrator 28. The multivibrator 28 is triggered by position signal 15 which enters input $28_a$. Pulse 28' of the multivibrator 28 begins at 15' of position signal 15, and its duration is dependent on the signal errors capaacitor $C_5$ at that moment, so that it provides a time delay between the pulse of the position signal and the sparking instant in the next cycle. Pulse 28' controls circuit 29 which in conjunction with spark coil 23 provides the necessary high voltage to have the spark at the electrodes of spark plug 24 for the ignition of fuel/air mixture.

These basic principles of the block diagram of FIG. 2 will be further detailed hereinafter, referring to FIGS. 3 - 7. To this end, it must be recalled that in the engine which was selected for illustrating this invention an explosion occurs at each crankshaft revolution. For making the phase comparison the crankshaft position sensor must then provide a pulse at each crankshaft revolution, the first front of the pulse corresponding with the predeterminated crankshaft position previously indicated as optimal so that the explosion pressure peak corresponds with a suitable position for the best performance (about12 degrees after TDC).

The pressure variation within the combustion chamber during compression and explosion phases is approximatively shown by the diagram in FIG. 3A, wherein pressure values (ordinate) are related to crankshaft angles (abscissa). The most significant crankshaft angles are indicated at a, b, c, d, e, as will be fully detailed hereafter.

As stated above, the explosion phase has an optimum as regards engine efficiency, when the crankshaft angle has a particular value in respect to the Top Dead Center (TDC).

Explosion sensor, indicated at 12 in FIG. 2, must provide a logic type signal 14 (ON-OFF) as in FIG. 3B, eventually through a suitable squarer indicated at 12' in FIG. 2, which should not be affected by a significant phase variationn on the beginning of the output signal when a variation occurs of the amplitude of the input signal.

The squarer circuit is beyond the objects of the present invention, so that it will not be detailed herein.

Phase comparison in this exemplifying embodiment is made between the two signal pulse first fronts. Position sensor 13 (FIG. 2) will then providie a logic type signal, the beginning of which must be coincidental with beginning of explosion signal 14 (when this latter occurs at the most suitable angular position) and may be liable to allow an initial regulation for the setting.

FIGS. 3A, 3B, and 3C are shown one upon the other and in a similar scale to evidence the relationship both between phases of signals 14 and 15, and between these latter and pressure variation within cylinder chamber, that is:

a = Bottom Dead Center (BDC)
b = Top Dead Center (TDC)
c = initial or first front 14' of explosion signal 14
d = end or second front 14" of explosion signal 14
e = Bottom Dead Center (BDC)

When crankshaft angle sensor 13 has been set in its position, if an explosion phase should occur at an angle which is different from the optimal one, a phase error will be provided, which will be before or after time as regards the first front 14' of explosion signal 14, in respect to first front 15' of position signal 15.

Phase comparator indicated at 16 in FIG. 2 substantially comprises some gate circuits and a bistable multivibrator circuit, which are in themselves known.

Both signals 14, 15 may control bistable multivibrator by the first front of each one, i.e., 14' and 15', respectively, so that the bistable multivibrator assumes one of its two possible states, while upon sensing the end front of each one i.e., 14" and 15", respectively, the bistable multivibrator assumes the other of its two possible states. The bistable multivibrator will then change its state in agreement with the initial front of either of the two signals being the very first to arrive (namely, explosion signal 14 when explosion is in advance, or position signal 15 when explosion is after time in respect to the optimal crankshaft position) and comes back to its original state at the end of either of the two signals being the very first to end.

This change of the state of the bistable multivibrator is better explained by diagrams in FIGS. 4A, 4B, 4C, abscissa scale of which is similar. FIG. 4A shows explosion signal 14 which, for any reason, began in advance in respect to its optimal position (being shown by dotted line in FIG. 4A). FIG. 4B shows position signal 15, and FIG. 4C shows pulse 18' which is provided by the bistable multivibrator.

The pulse of the bistable multivibrator is used to enable some NAND or AND gate circuits so that from the outputs of the phase comparator an error signal goes out, if, and only if, there is a phase difference between initial fronts 14' and 15' of the two pulses, and not when there is a phase difference between end fronts 14'', 15'', respectively.

Many circuit configurations are possible which are adapted to perform the above phase comparison through a different combination of described operations, that is, by using simple, double, triple, etc. gates having positive or negative logic.

Figure 5:
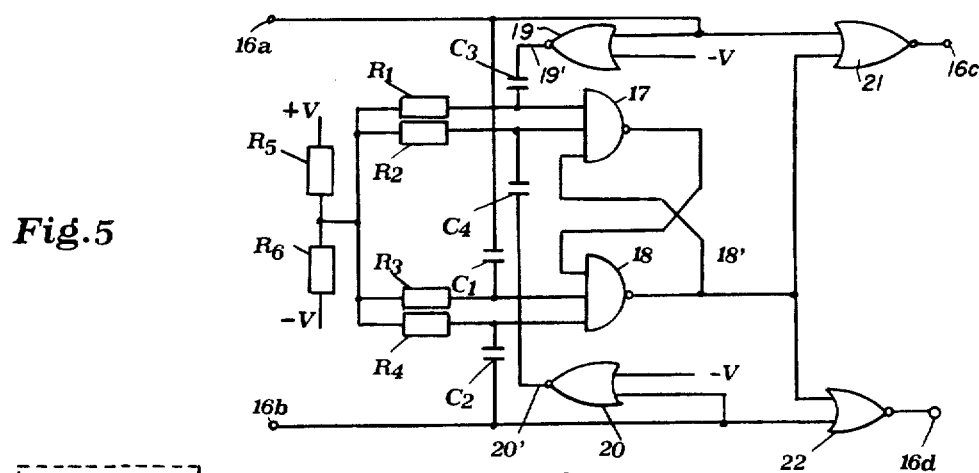
FIG. 5 is a schematic illustration of circuit relating to phase comparator component.

An example is illustrated in FIG. 5 and operation of same will now be examined in detail.

Explosion signal 14 is present at the point $16_a$ and position signal 15 at $16_b$ both being of positive polarity.

Gates 17 and 18, of NAND type for positive logic and having three inputs, together with resistors $R_1$, $R_2$, $R_3$ and $R_4$, form a bistable multivibrator 16'. The resistors serve to maintain normally inhibited inputs to which they are connected polarizing these inputs by means of the voltage which is supplied from a voltage divider formed by resistors $R_5$ and $R_6$.

This bistable multivibrator 16' may be operated by means of negative fronts only, and precisely through $C_1$ or $C_2$ to take on one of its two possible states, and through $C_3$ and $C_4$ to take on the other state.

Components 19, 20, 21 and 22 are two input gates of NAND type for negative logic.

Gates 19 and 20 have at their inputs the two signals which are present at inputs $16_a$ and $16_b$ respectively, and at their outputs with the signals still being however, of inverted polarity. This is because of their operation as simple inverters, the second input being connected to the negative of the source.

The first front (negative) of signals 19' and 20' coming out from gates 19 and 20, respectively, may operate bistable multivibrator 16' through capacity $C_3$ and $C_4$, respectively, to cause the change of its state.

It will be understood that said operation is due to either of two signals 19' and 20' being the very first to arrive, while the second signal has no effect.

The two signals of circuit inputs $16_a$ and $16_b$ may similarly operate bistable multivibrator 16' by means of its second front (negative) through capacitors $C_1$ and $C_2$ so that the bistable multivibrator may return to its initial state. Also here it will be understood that such operation is due to either of the two signals being the very first to end, while the other has no effect.

At the output of gate 18 the pulse 18' is present, which is provided by bistable multivibrator 16' with a negative polarity. Such pulse 18' is sent to one input of both gates 21 and 22. Signals of circuit inputs $16_a$ and $16_b$ are connected to the other input of said gates 21 and 22.

When the beginning 14' of explosion signal is in advance in respect to that 15' of position signal, there will be an error signal at the output of gate 22 (output $16_d$ of circuit) which is in the form of a positive pulse having a duration equal to the advance.

On the contrary, when the explosion signal begins at a later print of time than the position signal, the error signal will be present at the output of gate 21 (output $16_c$ of the circuit), which is in the form of a positive pulse, the duration of which equals the time difference period.

There will be no signal at the outputs when the first front of the two signals are coincidental.

As stated above, FIG. 4D shows the error signal being present at the output of gate 22 (FIG. 5). With regard to this, it is advisable to recall that, due to the effect on simultaneous incidence of impulse 18' from bistable multivibrator 16', the error signal is only provided as a consequence of the existing difference between first fronts of the two signals, and not because of a difference at the end fronts thereof.

In FIGS. 3A, 3B, 3C and 4A, 4B, 4C and 4D the various rectangular signals have all been shown as having a positive polarity for making the illustration of the embodiment easier. It will however, be understood by those skilled in the art that circuit components having an opposite or mixed polarity may also be provided without causing any difference in the desired purposes. Indeed, it should be recalled that the circuit of FIG. 5 is an example of an embodiment of the phase comparator 16 of FIG. 2.

The error signals which are present at output $16_c$ or $16_d$ of phase comparator 16 control the current regulator with ON-OFF switches 25, 26 in FIG. 2 which are components of the integrator circuit as will be detailed hereafter.

Position signal 15 gives the starting trigger to a monostable multivibrator circuit 28 (FIG. 2) which is used as an actuator for the ignition advance regulation in this embodiment of the invention.

Pulse 28' which is provided by the monostable multivibrators 28 inserts a delay between the position signal and the generation of the spark for the next explosion. The duration of the pulse and therefore the delay brought about by the same may be regulated through a voltage, as will be detailed hereafter, so that its function is that of regulating the spark advance angle in respect to the optimal explosion position. Thus, for example, to reduce the advance angle there will be a duratiton increase of the pulse being provided by the monostable multivibrator.

It is desirable that the duration of pulse 28' of the monostable multivibrator ranges between 0.5 sec. (which is assumed as the time for a crankshaft revolution at the minimum speed condition) and a time which may be calculated by using the following simple formula:

$$T_d = (1/N - 0.004) \text{ sec.}$$

wherein N indicates the maximum number of revolutions per second reachable by the engine (so that 1/N indicates the requested time for one revolution thereof at its peak r.p.m.) and 0.004 seconds is the maximum time which has been assumed as elapsing between the spark and the explosion.

Figure 7:
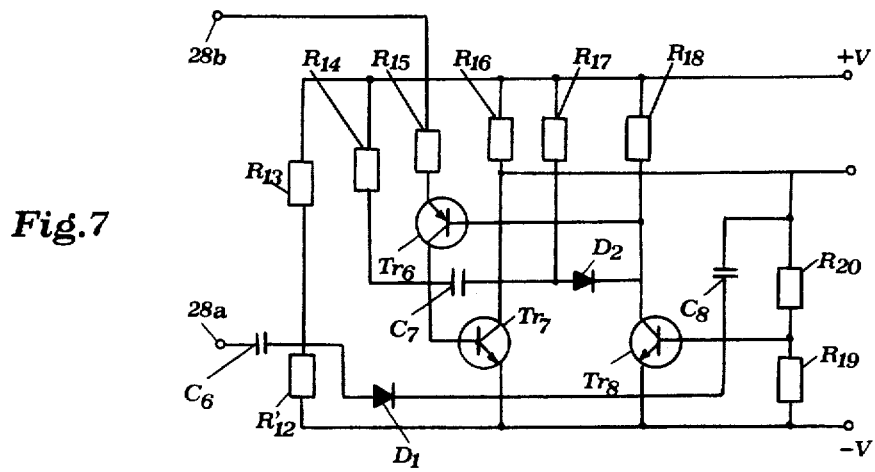
FIG. 7 is a schematic illustration of the monostable multivibrator which is used in this example embodiment as actuator of ignition advance.

With regard to the duration of pulse 28' of monostable multivibrator 28 its variation may be carried out by varying the voltage of the negative feedback which is constituted by the integrated and power amplified error signal. Through a suitable circuit which is cleared hereafter, it provides a variation corresponding to discharge current of that capacitor which characterizes the monostable multivibrator pulse duration; this capacitor will be better examined later in a detailed description of an example of a monostable multivibrator circuit (FIG. 7).

Negative feed-back voltage is provided by capacitor $C_5$ (FIG. 2) which together with the input impedance of impedance adapter device 27 forms a very great time constant (for example 100 seconds), so that voltage at its terminals may be considered as constant because of the quantities at stake and when the corrections are left out of consideration.

When for any reason (increase or decrease of fuel/air mixture, or mechanical load, etc.) engine RPM is varying, or because of any other variation a shift of the explosion phase with respect to the optimal position occurs, then a phase displacement takes place between first fronts of explosion and position signals 14' and 15' respectively, and such phase displacement supplies an error signal at output $16_c$ or output $16_d$ of phase comparator 16 (FIG. 2) as stated above. This error signal constitutes a voltage pulse (or a set of voltage pulses shorter and shorter) which controls either circuits 25, 26, according to whether explosion occurs after time or in advance, respectively.

Blocks 25 and 26 of FIG. 2, together with capacitor $C_5$ and block 27 (impedance adapter device) form the error signal integrator. They are current regulators which will be described in detail hereafter, as stated above.

In their stationary state, they are inhibited and the conductive state of same is obtained through the error signal pulses, so that voltage pulses are converted to current pulses (being positive in relation to the one and negative to the other) which enter capacitor $C_5$ and modify charge voltage thereof. The new charge voltage of the capacitor modifies in turn the duration of pulse 28' of monostable multivibrator 28, so that sparking will occur slightly in advance or after time with progressively decreasing the error with a succession of explosions.

While having a sequential before or after time ignition spark correction, in relation to a succession of error signals coming out from comparator 16, it will be understood by those skilled in the art that the reduction of same to a minimal practically negligible value or even the complete annulment of the error will actually occur in a split second.

To favour this purpose, the current regulators must be designed with suitable dimensions, so that the system may be readily responsive without giving, however, any magnified correction. In this latter case if such a magnification-occurred, an undesirable phase error oscillation would be provided.

Pulse 28' supplied by monostable multivibrator 28 actuates circuit 29 (FIG. 2) which together with coil 23 forms the final power stage for providing the high voltage pulse for spark plug 24. Only a brief discussion is provided here about the end stage as it is not part of the present invention features and claims thereof. It may be done in various ways, for example by using controlled diodes or transistors, or the like, and with regard to this there are patented systems. The essential thing is that the sparking instant be bound to the duration of pulse 28' of monostable oscillator 28, that is the time lapse between the position signal pulse and sparking must be a function of the monostable pulse duration, which thus determines the ignition advance in respect to the optimal point of explosion pressure peak, and the provides the desired automatic spark regulation for the optimal engine efficiency.

Figure 6:
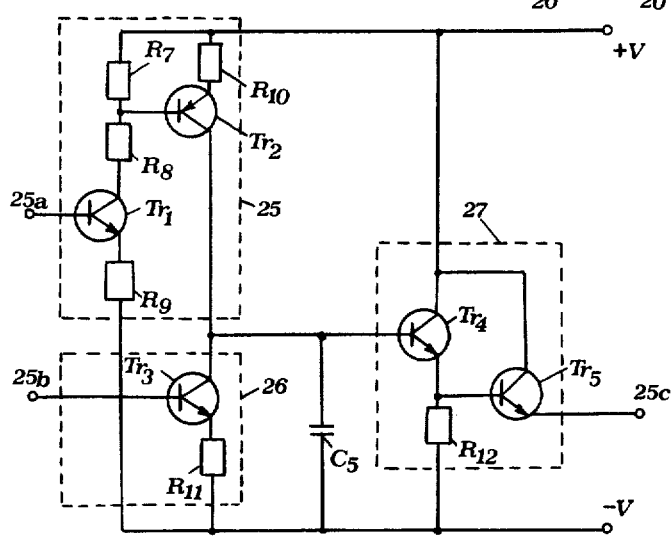
FIG. 6 is a schematic illustration of error signal integrator with its impedance adapting device: an integrator as provided in this electronic circuit of ignition advance regulation.

FIG. 6 shows an example of an embodiment relating to current regulators with ON-OFF switches 25 and 26 of FIG. 2.

$Tr_3$ is a normally inhibited NPN transistor which is switched on directly by the pulses entering point $26_a$ (and coming out from $16_d$ of phase comparator 16 of FIG. 2).

The current which is flowing from emitter to collector of the transistor, in the presence of error signal pulses, is limited by resistor $R_{11}$ and may be deduced by the following equation:

$$I = V_e - V_{BE}/R_{11} \text{ ampere}$$

wherein $V_e$ is the error pulse voltage and $V_{BE}$ the voltage drop between base and emitter of the transistor, in its absolute value.

$Tr_2$ is a PNP transistor having a function similar to $Tr_3$. Current pulses which are supplied by this transistor are, however, of an inverted polarity.

$Tr_1$, together with $R_7$, $R_8$, $R_9$ serves to transfer the pulses entering point $25_a$ (and coming out from point $16_c$ of phase comparator 16 of FIG. 2) to the base of $Tr_2$, with suitable amplitude and polarity as well as a proper voltage pedestal so that it remains inhibited in absence of pulses.

Resistor $R_{10}$ may be equal to $R_{11}$, and the current throughout $Tr_2$ is calculated by using the same formula as for $Tr_3$.

The function of the circuit comprising $Tr_4$, $Tr_5$ and $R_{12}$ is that of an impedance adapter device, as stated above, and serves to transfer to a low-impedance the charge voltage of capacitor $C_5$. Such a component is shown at 27 in FIG. 2 and forms the power amplifier of the integrated error signal.

This impedance adapter device may also be embodied by using an operational amplifier of the integrated type, with a COMMON MODE INPUT assembling.

FIG. 7 shows an embodiment of monostable oscillator 28, wherein $Tr_7$, $Tr_8$, $R_{12}$, $R_{13}$, $R_{16}$, $R_{17}$, $R_{18}$, $R_{19}$, $R_{20}$, $D_1$, $D_2$, $C_6$, $C_8$, together with $R_{14}$ and $C_7$ form a known circuit configuration of a monostable oscillator.

The value of $R_{14}$ must be such that $Tr_7$ will be maintained in its full conductivity.

It was found that the capacity of $C_7$ may be calculated by means of the following equation:

$$C_7 = 0.5 \times 0.43/k \times R_{14} \text{ farad}$$

wherein 0.5 (sec.) is the time being assumed as necessary for revolution of the crankshaft in its minimal speed, 0.43 is the ratio of common to natural logarithms, and $k$ is a constant which depends on circuit configuration and supply voltage. In the case of this embodiment, when a supply voltage of 12 V is assumed, $k=0.32$.

With regard to this it should, however, be pointed out that, when supply voltage is varied, the variations of the $k$ are minimal, so that the above indicated value of 0.32 may be considered as suitable in any case, because of the negligible importance of an eventual error.

$Tr_6$ and $R_{15}$ form, in the circuit of FIG. 7, a current regulator which is normally inhibited, as the base of $Tr_6$ has a positive potential which is greater than the emitter. Its conductive state corresponds to the monostable multivibrator pulse, as the base voltage is then falling to about zero volt.

The current which is flowing from emitter to collector of $Tr_1$ is a function of the voltage at point $28_b$ of the circuit, in accordance with the above mentioned relationship, namely:

$$I = V_c - V_{BE}/R_{15} \text{ ampere}$$

wherein $V_c$ is the voltage of feed-back 27' at input $28_b$ of such circuit (coming out from impedance adapter device 27 in FIG. 2), and $V_{BE}$ is the voltage drop between base and emitter of $Tr_6$, in its absolute value. This current I, which is a function of the feed-back voltage, serves to modify the pulse duration. Resistor $R_{15}$ must be dimensioned so that at the positive limit of the feed-back voltage variation range, the discharge current of capacitor $C_7$, through resistor $R_{15}$ is such that the pulse supplied from monostable multivibrator 28 has the required duration for the engine maximal speed.

To calculate $R_{15}$ the folloaing formula was found as useful:

$$R_{15} = k_1 (1/N - 0.004)/C_7$$

wherein $K_1$ is a constant depending on the circuit configuration (and in the case being shown in FIG. 7 its value is 0.75), 1/N is the time (in seconds) being assumed as necessary for a revolution of the crankshaft at its maximal speed, 0.004 (seconds) is the maximal time which is assumed as elapsing between spark and explosion pressure peak and $C_7$ is the capacitance as previously calculated.

At input $28_a$ of the circuit a pulse 15 of the position signal is present, which has a positive polarity. Its first front, derived by means of $C_6$ and $R_{12}$, triggers the monostable multivibrator while the second or end front has no effect as it is blocked by diode $D_1$.

Output $28_c$ supplies the positive pulse of monostable multivibrator, by means of which final stage 29 is actuated and this latter together with coil 23 provides the spark between the electrodes of spark plug 24 (FIG. 2).

On the ground of final stage configuration it may be eventually desirable to take up the monostable multivibrator negative pulse from $Tr_8$ collector rather than the positive pulse.

The whole circuit system as in FIG. 2, or the partial component circuits as described, or equivalent circuits, except the sensors and capacitors $C_5$ and $C_7$, may be manufactured with the technique of integrated circuits. Sizes and costs thereof will therefore be reduced to the minimum.

Finally, it should be noted that the regulator of the present invention may eventually be employed for completing one of the above cited coarse systems of control which are used in present practical applications. In accordance with the above description and illustrations thereof, this regulator represents a highly efficient means by which an exact correction of phase-displacement may be reached.

As stated above, description and drawings refer to a preferred embodiment of the present invention which has been selected as illustrating example thereof. Changes and modifications must then be considered as possible for realizing automatic electronic regulator systems of the ignition advance, with phase comparison and electric negative feed-back on condition that they are adapted for satisfying the various application needs and constructive exigencies. That is, changes and modifications may be resorted to within the purpose of the invention.

Thus, for example, instead of a monostable multivibrator as described and illustrated, an astable multivibrator may be employed, whether synchronized or not, on the condition that it is controlled in a like manner of the above cited current regulator.

What I claim is:

1. An automatic engine ignition control apparatus, comprising:
    a first transducer for generating a signal representing the explosion of a cylinder of said engine;
    a second transducer generating a signal indicating the position of the engine crankshaft;
    means for comparing the signals generated by said first transducer and said second transducer;
    means for generating an error signal responsive to said means for comparing; and
    means for generating optimum spark ignition signals controlled by said means for generating an error signal whereby said spark ignition signals are either advanced or retarded to maintain a predetermined relationship between and peak explosion of said cylinder and the top-dead-center position of said crankshaft for each cycle of said engine.

2. An automatic engine ignition control apparatus as in claim 1 wherein said means for comparing includes a bistable multivibrator operative to change state during each engine cycle in accordance with the first occurrence of said first and second transducer signals and reset to its original state upon the occurrence of the first of said first and second transducer signals to terminate, said multivibrator including first and second outputs respectively representing an advancement or retardation of said spark ignition signals.

3. An automatic engine ignition control apparatus as in claim 2 wherein said means for generating an error signal includes first and second input circuits respectively responsive to said first and second outputs, a capacitor connected to be charged by said first or second input circuits, and means for discharging said capacitor during the interval between cycles of said engine.

4. An automatic engine ignition control apparatus as in claim 3 wherein said means for generating spark ignition signals includes a monostable multivibrator having a time constant which is varied in accordance with the charge on said capacitor.

* * * * *